(12) United States Patent
Kezuka et al.

(10) Patent No.: US 7,759,281 B2
(45) Date of Patent: Jul. 20, 2010

(54) PHOTOCATALYST CONTAINING METALLIC ULTRAFINE PARTICLES AND PROCESS FOR PRODUCING SAID PHOTOCATALYST

(75) Inventors: Masamichi Kezuka, Tokyo (JP); Kiyoshi Miyashita, Tokyo (JP); Ryohei Ogawa, Tokyo (JP); Akihiro Hishinuma, Tokyo (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 663 days.

(21) Appl. No.: 11/035,971

(22) Filed: Jan. 18, 2005

(65) Prior Publication Data

US 2005/0159306 A1 Jul. 21, 2005

(30) Foreign Application Priority Data

Jan. 16, 2004 (JP) .............................. 2004-009430

(51) Int. Cl.
*B01J 23/00* (2006.01)
(52) U.S. Cl. ...................... 502/309; 502/308; 502/349; 502/350
(58) Field of Classification Search ................ 502/350, 502/326, 300, 325, 330, 339, 344, 349
See application file for complete search history.

(56) References Cited

U.S. PATENT DOCUMENTS

| 4,367,167 | A | * | 1/1983 | Lee et al. | ..................... 502/339 |
| 5,977,012 | A | * | 11/1999 | Kharas et al. | ................ 502/326 |
| 6,121,191 | A | * | 9/2000 | Komatsu et al. | ............ 502/330 |
| 2005/0159306 | A1 | * | 7/2005 | Kezuka et al. | .............. 502/350 |

FOREIGN PATENT DOCUMENTS

| JP | 2001-224969 | | 8/2001 |
| JP | 2001224969 A | * | 8/2001 |

* cited by examiner

*Primary Examiner*—Jerry Lorengo
*Assistant Examiner*—Jennifer A Smith
(74) *Attorney, Agent, or Firm*—Antonelli, Terry, Stout & Kraus, LLP.

(57) ABSTRACT

There is disclosed a photocatalyst which comprises a substrate having a photocatalytic function and metallic nanocolloid particles that are supported on the substrate by the use of a metallic nanocolloid liquid substantially free from a protective colloid formation agent. A highly active photocatalyst containing metallic ultrafine particles is provided by bringing a substrate such as fine particles having a photocatalytic function into contact with a metallic nanocolloid liquid which is substantially free from a protective colloid formation agent, and which has favorable dispersion stability even if containing metallic nanocolloid particles in a relatively high concentration. Accordingly the photocatalyst containing metallic ultrafine particles can be produced at a low cost without being restricted on the place of production.

22 Claims, No Drawings

PHOTOCATALYST CONTAINING METALLIC ULTRAFINE PARTICLES AND PROCESS FOR PRODUCING SAID PHOTOCATALYST

BACKGROUND OF THE INVENTION

1. Field of the Invention

The present invention relates to a photocatalyst containing metallic ultrafine particles, a supported catalyst in which the above-mentioned photocatalyst containing metallic ultrafine particles is supported on a carrier and processes for producing the photocatalyst and the supported catalyst. In more detail the present invention is concerned with a photocatalyst containing metallic ultrafine particles which comprises a substrate such as fine particles having a photocatalytic function and metallic nanocolloid particles that are supported on the substrate by the use of a metallic nanocolloid liquid substantially free from a protective colloid formation agent; a supported catalyst in which the photocatalyst containing metallic ultrafine particles is supported on a carrier; and processes for producing the photocatalyst and the supported catalyst.

2. Description of the Related Arts

In recent years, attention has been focused upon the methods which carry out deodorization, antimicrobials, disinfection, antifouling, removal of harmful material, prevention against dimming of glass and mirror and the like by utilizing the activities of a photocatalyst.

A photocatalytically activated material (hereinafter sometimes referred simply to as "photocatalyst"), when being irradiated with rays having energy not lower than its band gap, is excited to generate electrons on conductive bands and also positive holes on valence electron bands. It is known that the electrons thus generated reduce surface oxygen to form superoxide anions ($.O^{2-}$), while the positive holes oxidize surface hydroxyl groups to form hydroxyl radicals (.OH), and these reactively activated oxygen species exhibit a strong oxidizing decomposition function, thereby decomposing in high efficiency, organic substances that are attached to the surfaces of the photocatalyst.

Practically useful photocatalytically activated material is titanium dioxide, particularly anatase-type titanium dioxide. Further it is a general practice to install on a layer of the photocatalytically activated material, a shielding layer of a platinum series metal such as platinum, palladium, rhodium, ruthenium or the like for the purpose of accelerating the activities of the photocatalyst. The platinum series metal to be added thereto functions as a promoter for the photocatalyst, and plays a role in enhancing the oxidizing activity therefore. That is to say, the titanium oxide based photocatalyst which is incorporated with a noble metal such as platinum has strong photooxidizing power, thereby completely oxidizes almost all organic substances, and exhibits such effect as exterminating microorganisms by photodecomposing the surfaces thereof. Thus various proposals have been made on air cleaning filters that utilize the above-mentioned composite catalyst in which a platinum series catalyst is supported on the photocatalyst (Japanese Patent Application Laid-Open No. 71323/1998 (Heisei 10), Claims).

Various proposals have been made on the method for supporting metallic particles on the photocatalyst, and are exemplified by immersion method and photoelectrodeposition method. The immersion method is a method which comprises immersing photocatalyst particles of titanium oxide or the like in an aqueous solution of a metal with a proper concentration during a prescribed period of time, so that the metallic salt is supported on the photocatalyst and thereafter, reducing the metallic salt with a reducing agent (for instance, refer to Japanese Patent Application Laid-Open No. 71323/1998 (Heisei 10), paragraph 0025).

However, the immersion method usually necessitates heating upon reducing a metal, and the heating sometimes causes aggregation of supported metallic fine particles. Such aggregation thereof, when deteriorates the dispersion state of the metallic particles, lowers photocatalytic activity. In addition from the viewpoint of production of the photocatalyst, the method involves the problem in that there is required a unit for heating at the time of reduction, which becomes a factor of an increase in initial cost, while environmental consideration is made necessary depending upon volatile components generated by heating, whereby a supporting method and environment upon the supporting are unfavorably limited.

The photoelectrodeposition method is a method which comprises dispersing photocatalyst particles of titanium oxide or the like in a solution containing a metal in a proper amount, and irradiating the same with ultraviolet ray for a proper period of time in the presence of a small amount of a reducing agent such as an alcohol or the like, so that the metal is supported on the photocatalyst by the photoreducing power of the photocatalyst powders (for instance, refer to Japanese Patent Application Laid-Open No. 71323/1998 (Heisei 10), paragraph 0026).

Nevertheless, it is difficult for the photoelectrodeposition method to impart uniformity in a nanolevel to the supported metallic particles, thereby bringing about difficulty in controlling the particle diameter and dispersibility of the particles.

Moreover there is disclosed, as an other method for supporting metallic particles on the photocatalyst, a method which comprises immersing the photocatalyst in a metallic nanocolloid liquid containing metallic nanocolloid fine particles, so that the metallic particles are supported on the photocatalyst. The above-mentioned method has advantages of simple operation, dispensing with an expensive coating unit and the like. By the term "nanocolloid" as used herein is meant colloid particles having an equivalent diameter of smaller than 100 nm, approximately.

Notwithstanding the advantage, since the above-mentioned metallic nanocolloid liquid is generally poor in dispersion stability of metallic nanocolloid particles, and is liable to cause aggregation, there are usually taken measures for enhancing dispersion stability thereof through the formation of a protective colloid by adding a protective colloid formation agent such as water soluble high molecular compound exemplified by polyvinyl alcohol, polyvinyl pyrrolidone or gelatin, or a surfactant.

For instance, there is disclosed a process for producing noble metal fine particles supported on photocatalyst thin films which comprises coating thin films having a photocatalytic function with noble metal fine particulate colloid which is stabilized with a surfactant and thereafter heat treating the coating at about 400 to 600° C. in a reducing atmosphere for instance, refer to Japanese Patent Application Laid-Open No. 71137/1999 (Heisei 11), Claims) and the like.

However, when use is made of the protective colloid formation agent in such a manner in the case of metallic nanocolloid particles being supported on a substrate, the nanocolloid particles are supported with the protective colloid formation agent attached as such to the surfaces thereof, whereby it follows that the resultant carrier of the metal contains organic substances as well. Such carrier of metal containing the organic substances sometimes fails to sufficiently exert the objective functions and in this case, necessitates measures for removing the organic substances by means of a firing treatment. Further a firing treatment is impossible depending upon the type of substrate, thereby bringing about the problem in that the type of substrate is inevitably restricted.

There is known, as a process for producing metallic nanocolloid liquid without the use of a protective colloid formation agent, for instance, a method which comprises adding a reducing agent in a solution in which a metal salt is dissolved, so that metallic fine particles are formed by reducing metallic ions (for instance, refer to Japanese Patent Application Laid-Open No. 224969/2001 (Heisei 13) and Surface, Vol. 21, No. 8 pp 450 to 456 (1983)).

In regard to a method for supporting metallic fine particles on a photocatalyst, in order to support the particles in a definite amount or more, metallic nanocolloid particles in an amount of some extent are preferably supported from the aspect of operation, whereby it is required to increase the colloid particles concentration to some extent in the metallic nanocolloid liquid.

Nevertheless with regard to a process for producing metallic nanocolloid liquid without the use of a protective colloid formation agent, when an attempt is made to prepare metallic nanocolloid liquid containing high concentration metallic nanocolloid particles, there is created a problem in that aggregative precipitation of colloid particles easily takes place. For instance, in the case where platinum is used as a metal without using a protective colloid formation agent, the limiting concentration of metallic nanocolloid solution capable of being prepared has been 150 ppm by mass, approximately.

SUMMARY OF THE INVENTION

The object of the present invention, which was made under the above-mentioned circumstances, is to provide a highly activated photocatalyst containing metallic ultrafine particles by using a metallic nanocolloid liquid which is substantially free from a protective colloid formation agent, and which is excellent in dispersion stability even if the liquid contains metallic nanocolloid particles in a relatively high concentration, and bringing the liquid into contact with a substrate such as fine particles having a photocatalytic function.

Other objects thereof will become obvious from the text of the specification hereinafter disclosed.

Such being the case, intensive extensive research and investigation were made by the present inventors in order to achieve the foregoing objects. As a result, it has been discovered that a highly activated photocatalyst containing metallic ultrafine particles is obtainable by using a metallic nanocolloid liquid which is free from a protective colloid formation agent, and which is excellent in dispersion stability, and bringing the liquid into contact with a substrate such as fine particles having a photocatalytic function.

That is to say, the present invention provides the following.

1. A photocatalyst containing metallic ultrafine particles which comprises a substrate having a photocatalytic function and metallic nanocolloid particles that are supported on the substrate by the use of a metallic nanocolloid liquid substantially free from a protective colloid formation agent;
2. The photocatalyst containing metallic ultrafine particles as set forth in the preceding item 1 wherein the substrate having a photocatalytic function comprises fine particles having a photocatalytic function;
3. The photocatalyst containing metallic ultrafine particles as set forth in the preceding item 1 wherein the content of the protective colloid formation agent in the metallic nanocolloid liquid is in the range of 0 to 200 ppm by mass expressed in terms of total carbon on the basis of the metallic nanocolloid particles;
4. The photocatalyst containing metallic ultrafine particles as set forth in the preceding item 1, wherein the concentration of the metallic nanocolloid particles in the metallic nanocolloid liquid is in the range of 40 to 3000 ppm by mass;
5. The photocatalyst containing metallic ultrafine particles as set forth in the preceding item 1 wherein the average particle diameter of the metallic nanocolloid particles in the metallic nanocolloid liquid is in the range of 1 to 5 nm;
6. The photocatalyst containing metallic ultrafine particles as set forth in the preceding item 2 5 wherein the fine particles having a photocatalytic function are brought into contact with the metallic nanocolloid liquid and thereafter, a dispersion medium is distilled away;
7. The photocatalyst containing metallic ultrafine particles as set forth in the preceding item 1 wherein the metallic nanocolloid particles are those of at least one kind of noble metal selected from the group consisting of platinum, ruthenium, palladium, rhodium, rhenium, osmium and gold;
8. The photocatalyst containing metallic ultrafine particles as set forth in the preceding item 2 wherein the average particle diameter of the fine particles having a photocatalytic function is in the range of 0.005 to 2 μm;
9. The photocatalyst containing metallic ultrafine particles as set forth in the preceding item 2 wherein the fine particles having a photocatalytic function are titanium dioxide fine particles;
10. A supported photocatalyst wherein the photocatalyst containing metallic ultrafine particles as set forth in the preceding item 2 is supported on a carrier;
11. The supported photocatalyst as set forth in the preceding item 10 wherein the material which constitutes the carrier is selected from the group consisting of carbon materials, inorganic ceramics, glass materials, metallic materials and organic high molecular materials;
12. A process for producing a photocatalyst containing metallic ultrafine particles which comprises bringing a substrate having a photocatalytic function into contact with a metallic nanocolloid liquid substantially free from a protective colloid formation agent, so that metallic nanocolloid particles are supported on fine particles having a photocatalytic function;
13. The process for producing a photocatalyst as set forth in the preceding item 12 wherein the substrate having a photocatalytic function comprises fine particles having a photocatalytic function;
14. The process for producing a photocatalyst as set forth in the preceding item 12 wherein the content of the protective colloid formation agent in the metallic nanocolloid liquid is in the range of 0 to 200 ppm by mass expressed in terms of total carbon on the basis of the metallic nanocolloid particles;
15. The process for producing a photocatalyst as set forth in the preceding item 12 wherein the concentration of the metallic nanocolloid particles in the metallic nanocolloid liquid is in the range of 40 to 3000 ppm by mass;
16. The process for producing a photocatalyst as set forth in the preceding item 12 wherein the average particle diameter of the metallic nanocolloid particles in the metallic nanocolloid liquid is in the range of 1 to 5 m;
17. The process for producing a photocatalyst as set forth in the preceding item 12 wherein the fine particles having a photocatalytic function are brought into contact with the metallic nanocolloid liquid substantially free from a protective colloid formation agent and thereafter, a dispersion medium for the metallic nanocolloid liquid is distilled away;

18. The process for producing a photocatalyst as set forth in the preceding item 13 wherein the metallic nanocolloid particles are those of at least one kind of noble metal selected from the group consisting of platinum, ruthenium, palladium, rhodium, rhenium, osmium and gold;

19. The process for producing a photocatalyst as set forth in the preceding item 13 wherein the fine particles having a photocatalytic function are titanium dioxide fine particles;

20. A process for producing a supported catalyst which comprises bringing fine particles having a photocatalytic function into contact with a metallic nanocolloid liquid substantially free from a protective colloid formation agent, so that the fine particles having a photocatalytic function are supported on a carrier;

21. The process for producing a supported catalyst as set forth in the preceding item 20 wherein the material which constitutes the carrier is selected from the group consisting of carbon materials, inorganic ceramics, glass materials, metallic materials and organic high molecular materials.

DESCRIPTION OF THE PREFERRED EMBODIMENT

The present invention is concerned with a photocatalyst containing metallic ultrafine particles which comprises a substrate having a photocatalytic function and metallic nanocolloid particles that are supported on the substrate, and is characterized in that the above-mentioned metallic nanocolloid particles are supported thereon by the use of s metallic nanocolloid liquid substantially free from a protective colloid formation agent.

The substrate having a photocatalytic function is not specifically limited provided that it is imparted with so called photocatalytic function such as deodorization, antimicrobials, disinfection, antifouling, removal of harmful material, prevention against dimming of glass and mirror and the like, and it is exemplified by fine particles having a photocatalytic function, photocatalyst thin films, glass and cloth each supporting a photocatalyst, and the like. The substrate in the present invention is preferably fine particles having a photocatalytic function from the viewpoint of ease of handling. Preferably, the particles have an average particle diameter in the range of 0.005 to 2 μm. The average particle diameter, when being at least 0.005 μm, brings about an advantage in that metallic ultrafine particles are apt to be supported around the fine particles having a photocatalytic function, whereas the average particle diameter, when being at most 2 μm, brings about an advantage in that fine particles having a photocatalytic function can be uniformly supported on a carrier as hereinafter described in detail. In view of the foregoing, the average particle diameter thereof is preferably in the range of 0.01 to 1 μm.

Various fine particles having a photocatalytic function are available, and exemplified by those of a metal such as titanium, vanadium, iron, copper, zinc, molybdenum, tungsten, aluminum, tin, lanthanum, cerium, magnesium, strontium, barium or the like, and an oxide of any of the metals. The fine particles may be used alone or in a composite or mixed form with at least one other species. Of these, fine particles of titanium dioxide, namely a titanium oxide are preferable and anatase type titanium dioxide is particularly preferable.

The metallic nanocolloid liquid to be used in the present invention is substantially free from a protective colloid formation agent. The protective colloid formation agent is a substance which is previously contained in a colloid liquid to maintain the dispersion stability of colloid particles, and which sticks to the surfaces of colloid particles to form a protective colloid. Examples of the protective colloid formation agent include for instance, watersoluble high molecular substance such as polyvinyl alcohol polyvinyl pyrrolidone and gelatin, surfactants, high molecular chelating agent (for instance, compounds as described on Japanese Patent Application Laid-Open No. 279818/2000 (Heisei 12), paragraph 0013).

In the present invention, the metallic nanocolloid particles have favorable dispersion stability and maintain stable dispersibility for a practically long period of time, for instance, 3 to 30 days even if the particles are substantially free from a protective colloid formation agent, which means that the content of the agent in the metallic nanocolloid liquid is in the range of 0 to 200 ppm by mass, approximately expressed in terms of total carbon on the basis of the metallic nanocolloid particles.

The concentration of the metallic nanocolloid particles in the metallic nanocolloid liquid can be selected in a wide range from low to high concentrations, but is generally in the range of 40 to 3000 ppm by mass, preferably 250 to 2000 ppm by mass, more preferably 500 to 2000, particularly preferably 1000 to 2000 from the standpoint of practical application at the time of supporting the metallic nanocolloid particles on the fine particles having a photocatalytic function and the dispersion stability of the particles.

The average particle diameter of the above-mentioned metallic nanocolloid particles is in the range of preferably 1 to 5 nm, more preferably 1.6 to 5 nm from the viewpoint of catalytic activity.

The type of the metallic nanocolloid particles is not specifically limited, but the particles are preferably those of at least one noble metal selected from the group consisting of platinum, ruthenium, palladium, rhodium, rhenium, osmium and gold.

The metallic nanocolloid liquid to be used in the present invention can be produced, for instance, by the following procedures.

Water to be used is available from pure water such as distilled water, ion exchanged water, ultrafiltered water or the like, which are sufficiently boiled to remove dissolved oxygen.

To the metallic salt aqueous solution which has been prepared using the pure water as mentioned above, is added an aqueous solution of a reducing agent so that the concentration of the metallic salt becomes $1 \times 10^{-4}$ to $15 \times 10^{-4}$ mol/liter, approximately, and the amount of the reducing agent becomes about 1 to 20 times equivalent based on the metallic salt. Subsequently the reaction is advanced in a boiling state for about 30 to 300 minutes and thereafter, is stopped by rapidly cooling to room temperature.

Subsequently as desired, unreacted metallic salt and reducing agent are removed by passing the reaction liquid after reaction completion through a column packed inside with an ion exchange resin, so that dilute metallic nanocolloid liquid is obtained. The extent of removal thereof can be judged by measuring the electroconductivity of the colloid liquid. In the case of treating 100 milliliter of colloid liquid, and using an ion exchange resin being Umberlite MB-1 (trade name, manufactured by Japan Organo Co., Ltd.), about 6 milliliter of the reaction liquid is sufficient. In this case extremely slight amount of the metallic nanocolloid particles are adsorbed onto the resin. Alternatively when a concentration step is carried out as hereinafter described, it is possible to treat with the ion exchange resin after the concentration.

The dilute metallic nanocolloid liquid thus obtained can be used for supporting as it is. However, in the case of using metallic nanocolloid liquid of high concentration for supporting, it can be prepared by heat treating the dilute metallic nanocolloid liquid under a mild condition, for instance, non-boiling condition so that the dispersion medium in the liquid is distilled away and the liquid is concentrated. In the case where boiling state takes place, for instance, depending upon the condition of the concentration, the colloid particles are liable to be aggregated by the influence of convection and/or break of bubbles. Accordingly, a mild condition is preferably selected so as not to give rise to the aggregation of colloid particles. In the case of the dispersion medium being water, it is possible to control the concentration of the colloid solution by distilling away the water under atmospheric or reduced pressure at a temperature of 50 to 90° C., approximately over a period of 15 to 240 minutes, while altering degree of vacuum, temperature and concentration hour.

The reducing agent in the above-mentioned method is not specifically limited provided that it is soluble in water, and is exemplified by alcohols, citric acid/homologs, carboxylic acids, ketones, ethers, aldehydes and esters, in which two or more species may be used in combination. Examples of alcohols include methanol ethanol, 1-propanol, 2-propanol ethylene glycol and glycerin. Examples of citric acid/homologs include citric acid, citrate such as sodium citrate, potassium citrate and ammonium citrate. Examples of carboxylic acids include formic acid, acetic acid, fumaric acid, malic acid, succinic acid, asparagic acid and carboxylates thereof. Examples of ketones include acetone and methyl ethyl ketone. Examples of ethers include diethyl ether. Examples of aldehydes include formaldehyde and acetoaldehyde. Examples of esters include methyl formate, methyl acetate and ethyl acetate. Of these, sodium citrate is preferable in particular for its high reducing power and easy handling. From the viewpoint of forming stable metallic nanocolloid particles having an average particle diameter of 1 to 5 nm, the reducing agent is preferably any of alcohols, citric acid/homolog and carboxylic acids, of which citric acid/homolog are particularly preferable.

There are usable as a reaction medium, for instance, water, alcohols, ketones, esters and ethers. Examples of alcohols include methanol, ethanol 1-propanol and 2-propanol. Examples of ketones include acetone, methyl ethyl ketone and methyl isobutyl ketone. Examples of esters include methyl formate, methyl acetate and ethyl acetate. Examples of ethers include methyl ethyl ether and diethyl ether. The above-cited reaction medium may be used alone or in combination with at least one other species, in which an aqueous medium such as water, alcohols or a mixture thereof is preferable.

On the other hand, the metallic salt is not specifically limited in the type, provided that it is dissolved in the reaction medium and is reduced by the reducing agent. Examples thereof include salts of platinum, ruthenium, palladium, rhodium, rhenium, osmium, gold, lead, iridium, cobalt, iron, nickel, copper and tin. Preferable metallic salts among them are chloride, nitrate, sulfate or metal complex compound thereof of a noble metal such as platinum, ruthenium, palladium, rhodium, rhenium, osmium or gold. The above-cited metallic salt may be used alone or in combination with at least one other species. In the case of combinational use, alloy colloid particles can be produced. When a platinum salt is used as a metallic salt, colloid particle diameter becomes particularly small, thereby enabling to obtain stable colloid particles having an average particle diameter of 1 to 5 nm, approximately. In particular, the use of chloroplatinic acid makes it possible to further enhance the uniformization of colloid particle diameter.

With regard to the photocatalyst containing metallic ultrafine particles according to the present invention, the content of the metallic ultrafine particles is preferably in the range of 0.005 to 1 part by mass based on 100 parts by mass of the substrate having photocatalytic function. The content, when being at least 0.005 part by mass, enables to sufficiently exert the function as a promoter, whereas the content, when being at most 1 part by mass, prevents the metallic ultrafine particles from aggregating or deteriorating the photocatalyst activity.

A method for supporting metallic nanocolloid particles on a substrate such as fine particles having a photocatalytic function is not specifically limited, but is achieved by bringing a substrate such as fine particles having a photocatalytic function into contact with a metallic nanocolloid liquid. Specifically, for instance, the substrate such as fine particles having a photocatalytic function may be immersed in the metallic nanocolloid liquid, and alternatively the liquid may be sprayed onto the substrate.

After the metallic nanocolloid is supported on the substrate by a method such as the above-mentioned immersion, spraying or the like, it is preferable to dry the catalyst system in order to remove the dispersion medium of the metallic nanocolloid liquid. The drying conditions can be selected in a variety of ways to the extent that the metallic fine particles supported on the substrate are not aggregated, and are preferably set on 100° C. or lower under atmospheric pressure. The drying can be effected under reduced pressure wherein the drying temperature is preferably lowered in accordance with the degree of reduced pressure.

It is possible to use the photocatalyst containing metallic fine particles which is supported on the substrate such as fine particles having a photocatalytic function as it is as a photocatalyst and as a supported photocatalyst by being supported on a carrier. Whether the photocatalyst containing metallic fine particles is used as it is as a photocatalyst or as a supported catalyst is properly optionally determined by the purpose of use of the photocatalyst.

The carrier to be used therein is that which is used as a carrier for conventional catalysts, and is not specifically limited provided that it is capable of maintaining high dispersion of the photocatalyst containing metallic fine particles. Examples of materials constituting the carrier include carbon materials, inorganic ceramics, glass materials, metallic materials and organic high molecular materials. Preferably, the carrier is composed of any of the above-cited materials, and is imparted with a surface area to some extent.

The carbon materials are exemplified by, for instance, activated carbon, carbon nanotubes, carbon nanophone and carbonaceous hollow fibers. The inorganic ceramics are exemplified by inorganic oxides such as silica, alumina, zirconia, silica-alumina, clay mineral and zeolite. The glass materials are exemplified by silicate based oxide glass. The metallic materials are exemplified by stainless steel aluminum alloys and copper alloys. The organic high molecular materials are exemplified by paper and cloth that are natural high molecular fibrous material and synthetic high molecular materials.

In the case where the photocatalyst containing metallic fine particles is used as a supported catalyst by being supported on a carrier, the photocatalyst is preferably contained in an amount of about 1 to 15 parts by mass based on 100 parts by mass of carrier components. The amount thereof, when being at least 1 part by mass, enables to sufficiently exhibit the working effect as a photocatalyst, whereas the amount, when being at most 15 parts by mass, causes the photocatalyst to be maintained on the carrier under a high dispersion state.

As a method for supporting on the carrier, the photocatalyst containing metallic fine particles according to the present invention, an impregnation method which is usually used as a catalyst-supporting method is preferably suitably usable. That is to say, the impregnation method is that which comprises dispersing the above-obtained photocatalyst containing metallic fine particles in a dispersion medium, and immersing the carrier in the dispersion medium just mentioned. Alternatively when the dispersion medium is of an aqueous system, a pore filling method and the like are usable in which water absorption quantity of the carrier is measured, the dispersion medium in an quantity corresponding the absorption quantity is brought into contact with the carrier, and the photocatalyst containing metallic fine particles is supported on a carrier in pores and surfaces thereof.

It is possible as well to support the photocatalyst on the carrier by immersing fine particles having photocatalytic function in the metallic nanocolloid liquid, and also immersing the carrier therein at the time of supporting the metallic nanocolloid particles on the particles having photocatalytic function.

In summarizing the working effect and the industrial utilizability of the present invention, it is made possible to uniformly support the metallic ultrafine particles on a substrate such as fine particles having a photocatalytic function, whereby highly active photocatalyst containing metallic ultrafine particles is obtainable. Moreover even in the case of variation in the form or shape of the substrate such as fine particles having a photocatalytic function, the photocatalyst can follow the variation and enables the metallic ultrafine particles to be supported thereon.

In addition, since use is made of the metallic nanocolloid liquid substantially free from a protective colloid formation agent as a liquid for supporting the metallic ultrafine particles, heating at a high temperature is unnecessary to remove the protective colloid. Further since metallic ultrafine particles are already in a reduced state, that is, in metallic state, when supported on the substrate such as fine particles having photocatalytic function, reduction operation is dispensed with. For these reasons, there is no need to take into consideration the metallic fine particles aggregation due to high temperature heating or reducing operation, thereby precluding a fear of losing the characteristics of metallic ultrafine particles. Furthermore, since high temperature heating and reducing operation are unnecessary, the metallic ultrafine particles are easy to support and at the same time, it is not required to consider environmental problems due to volatilization of dispersion media for metallic fine particles which accompanies heating and/or reduction.

By virtue of the working effect as described above, the photocatalyst containing metallic ultrafine particles according to the present invention can be produced at a low cost without being restricted on the place of production.

In what follows, the present invention will be described in more detail with reference to a working example, which shall never limit the present invention thereto.

EXAMPLE 1

(1) Preparation of Platinum Nanocolloid Liquid

Instruments such as a 1500 milliliter (mL) flask, 100 mL Erlenmeyer flask, 200 mL Erlenmeyer flask, reflux condenser and stirrer were immersed in aqua regia overnight, and were sufficiently washed with ion exchanged and ultrafiltered pure water. The 1500 mL flask was charged with 850 mL of the ion exchanged and ultrafiltered pure water and the stirrer, while the reflux condenser was installed above the flask, and was heated to raise the temperature up to 100° C. In order to remove dissolved oxygen in the pure water, boiling was continued as such for further one hour. On the other hand, chloroplatinic acid ($H_2PtCl_6.6H_2O$) in an amount of 400 mg (150 mg expressed in terms of platinum) was weighed and placed in the 100 mL Erlenmeyer flask, where ion exchanged and ultrafiltered pure water was added to attain a total volume of 50 mL. Further 1.0 g of sodium citrate was weighed and placed in the 200 mL Erlenmeyer flask, where ion exchanged and ultrafiltered pure water was added to attain a total volume of 100 mL. Dissolved oxygen in the pure water was removed and thereafter, aqueous solution of tetrachloroplatinic acid was added to the 1500 mL flask from the 100 mL Erlenmeyer flask, and the content of the 1500 mL flask was heated to raise the temperature up to 100° C. and was boiled for 30 minutes to remove dissolved oxygen in the pure water. Subsequently, the aqueous solution of sodium citrate was gradually added thereto from the 200 mL Erlenmeyer flask so as to maintain the boiling state. The reaction solution has a platinum concentration of 150 mg/L=$7.7\times10^{-4}$ mol/L=$3.08\times10^{-3}$ N, and the ratio of sodium citrate molar concentration to platinum molar concentration of 13.2. Since sodium citrate functions as a one electron donor, the ratio of sodium citrate equivalent concentration to platinum equivalent concentration becomes 3.3.

The aqueous solution of sodium citrate was wholly added to the 1500 mL flask and thereafter, the reducing reaction was continued under a boiling state, and was stopped after 90 minutes from the start of the reaction, whereupon the reaction liquid was rapidly cooled to room temperature. The reaction liquid thus cooled was passed through a column packed inside with an ion exchange resin Umberlite MB-1 (trade name, manufactured by Japan Organo Co., Ltd.), so that metallic ions and the reducing agent remaining in the reaction liquid were removed to obtain stable platinum colloid liquid. Thus measurements were made of the platinum colloid particles concentration in the platinum colloid liquid by means of emission spectrochemical analysis and of average particle diameter thereof by the use of a transmission electron microscope. As a result, the platinum colloid particles had a concentration of 120 mg/L and an average particle diameter of 1.1 nm.

(2) Supporting Platinum Colloid Particles on Titanium Dioxide Fine Particles

Titanium dioxide fine particles having an average particle diameter of about 0.02 μm (manufactured by Japan Aerosil Co., Ltd. under the trade name P 25) in an amount of 20 g was weighed and placed in a 500 mL Erlenmeyer flask. Then 125 mL of the platinum colloid liquid which had been prepared in the above-mentioned manner (5 mg expressed in terms of platinum colloid) was added in the Erlenmeyer flask just mentioned. Thus the titanium dioxide fine particles were brought into sufficient contact with the platinum colloid liquid by closing the lid of the flask and swinging the flask.

Thereafter the flask was allowed to stand for several hours until the titanium dioxide fine particles were settled to the bottom of the flask, and the supernatant liquid alone was removed with a syringe. Subsequently, the lid of the flask was opened to dry the content therein with a dryer for 12 hours at about 90° C., and then dried product thus obtained was crushed.

What is claimed is:

1. A process for producing a photocatalyst containing metallic ultrafine particles which comprises bringing a substrate comprising fine particles having a photocatalytic function into contact with a metallic nanocolloid liquid that has previously been prepared by adding a reducing agent to a metallic salt solution and removing unreacted metallic salt and reducing agent after reaction completion, said metallic nanocolloid liquid being substantially free from a protective colloid formation agent, so that metallic nanocolloid particles are supported on the substrate having a photocatalytic function, wherein the fine particles having a photocatalytic function are made of anatase-type titanium dioxide, and wherein the concentration of the metallic nanocolloid particles in the metallic nanocolloid liquid is in a range of 40 to 3000 ppm by mass.

2. The process for producing a photocatalyst containing metallic ultrafine particles according to claim 1 wherein the content of the protective colloid formation agent in the metallic nanocolloid liquid is in the range of 0 to 200 ppm by mass expressed in terms of total carbon on the basis of the metallic nanocolloid particles.

3. The process for producing a photocatalyst containing metallic ultrafine particles according to claim 1 wherein the average particle diameter of the metallic nanocolloid particles in the metallic nanocolloid liquid is in the range of 1 to 5 nm.

4. The process for producing a photocatalyst containing metallic ultrafine particles according to claim 1 wherein the fine particles having a photocatalytic function are brought into contact with the metallic nanocolloid liquid substantially free from a protective colloid formation agent and thereafter, a dispersion medium for the metallic nanocolloid liquid is distilled away.

5. The process for producing a photocatalyst containing metallic ultrafine particles according to claim 1 wherein the metallic nanocolloid particles are those of at least one kind of noble metal selected from the group consisting of platinum, ruthenium, palladium, rhodium, rhenium, osmium and gold.

6. A process for producing a supported catalyst which comprises bringing a substrate comprising fine particles having a photocatalytic function into contact with a metallic nanocolloid liquid that has previously been prepared by adding a reducing agent to a metallic salt solution and removing unreacted metallic salt and reducing agent after reaction completion, said metallic nanocolloid liquid being substantially free from a protective colloid formation agent, so that the substrate comprising the fine particles having a photocatalytic function are supported on a carrier and so that metallic nanocolloid particles are supported on the substrate comprising the fine particles, wherein the fine particles having a photocatalytic function are made of anatase-type titanium dioxide, and wherein the concentration of the metallic nanocolloid particles in the metallic nanocolloid liquid is in a range of 40 to 3000 ppm by mass.

7. The process for producing a supported catalyst according to claim 6 wherein the material which constitutes the carrier is selected from the group consisting of carbon materials, inorganic ceramics, glass materials, metallic materials and organic high molecular materials.

8. The process for producing a photocatalyst containing metallic ultrafine particles according to claim 1 wherein amount of the reducing agent added is 1 to 20 times equivalent based on the metallic salt.

9. The process for producing a photocatalyst containing metallic ultrafine particles according to claim 1 wherein said reducing agent is at least one selected from the group consisting of alcohols, citric acid and homologs thereof, carboxylic acids, ketones, ethers, aldehydes and esters.

10. The process for producing a photocatalyst containing metallic ultrafine particles according to claim 1 wherein the metal salt is selected from the group consisting of salts of platinum, ruthenium, palladium, rhodium, rhenium, osmium, gold, lead, iridium, cobalt, iron, nickel, copper and tin.

11. The process for producing a photocatalyst containing metallic ultrafine particles according to claim 1 wherein said metal salt is a chloride, nitrate, sulfate or metal complex compound of a noble metal.

12. The process for producing a photocatalyst containing metallic ultrafine particles according to claim 1 wherein the substrate, after being brought into contact with the metallic nanocolloid liquid, is subjected to a heat treatment, at a temperature of 50° to 90° C. so as to avoid aggregation of the metallic nanocolloid particles.

13. The process for producing a photocatalyst containing metallic ultrafine particles according to claim 1 wherein content of the metallic ultrafine particles is in a range of 0.005-1 part by mass based on 100 parts by mass of the substrate having a photocatalytic function.

14. The process for producing a photocatalyst containing metallic ultrafine particles according to claim 1 wherein the metallic ultrafine particles are already in a metallic state when supported on the substrate comprising the fine particles.

15. The process for producing a photocatalyst containing metallic ultrafine particles according to claim 6 comprising the further step of supporting the substrate comprising the fine particles on the carrier.

16. The process for producing a photocatalyst containing metallic ultrafine particles according to claim 6 wherein the metallic ultrafine particles are already in a metallic state when supported on the substrate comprising the fine particles.

17. The process for producing a photocatalyst containing metallic ultrafine particles according to claim 1 wherein amount of the reducing agent added is 1 to 20 times equivalent based on the metallic salt, and wherein a concentration of the metallic salt solution is $1 \times 10^{-4}$ to $15 \times 10^{-4}$ mol/l.

18. The process for producing a photocatalyst containing metallic ultrafine particles according to claim 1 wherein a metallic salt of the metallic salt solution is selected from the group consisting of chlorides, nitrates, sulfates and metal complex compounds of platinum, ruthenium, palladium, rhodium, rhenium, osmium and gold.

19. The process for producing a photocatalyst containing metallic ultrafine particles according to claim 1 wherein said reducing agent is citric acid.

20. The process for producing a photocatalyst containing metallic ultrafine particles according to claim 6 wherein amount of the reducing agent added is 1 to 20 times equivalent based on the metallic salt, and wherein a concentration of the metallic salt solution is $1 \times 10^{-4}$ to $15 \times 10^{-4}$ mol/l.

21. The process for producing a photocatalyst containing metallic ultrafine particles according to claim 6 wherein a metallic salt of the metallic salt solution is selected from the group consisting of chlorides, nitrates, sulfates and metal complex compounds of platinum, ruthenium, palladium, rhodium, rhenium, osmium and gold.

22. The process for producing a photocatalyst containing metallic ultrafine particles according to claim 6 wherein said reducing agent is citric acid.

* * * * *